March 26, 1974   R. VAN LAETHEM   3,799,817
GLASS LAMINATE AND METHOD OF MANUFACTURE
Filed June 1, 1971   4 Sheets-Sheet 3

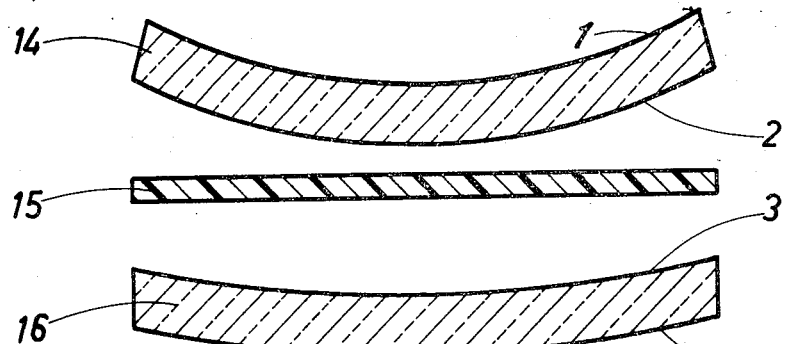
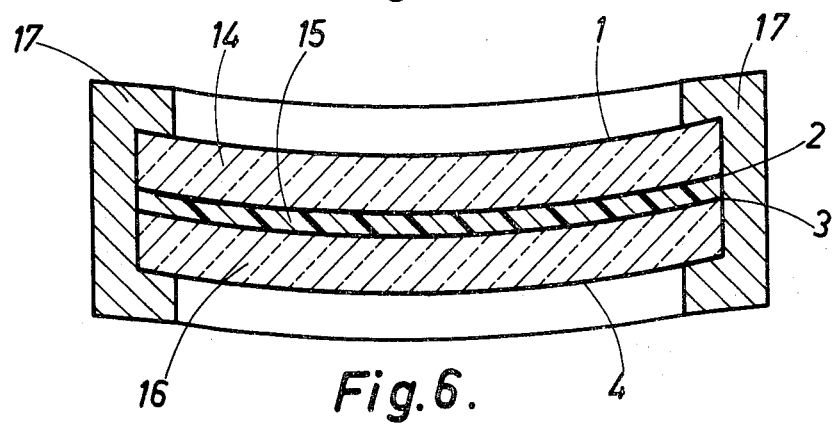
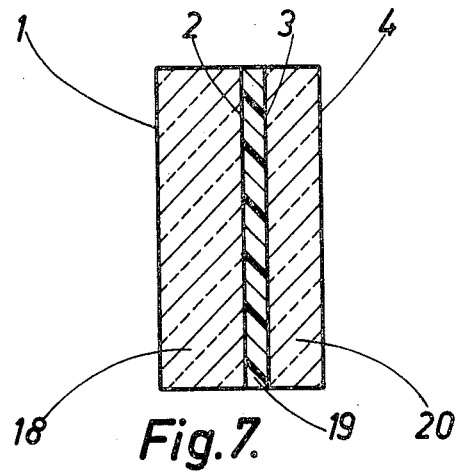

INVENTOR
Robert Van Laethem

BY *Spencer & Kays*

ATTORNEYS

March 26, 1974  R. VAN LAETHEM  3,799,817
GLASS LAMINATE AND METHOD OF MANUFACTURE
Filed June 1, 1971  4 Sheets-Sheet 4

INVENTOR
Robert Van Laethem

BY Spencer & Kaye

ATTORNEYS.

3,799,817
GLASS LAMINATE AND METHOD OF MANUFACTURE
Robert Van Laethem, Loverval, Belgium, assignor to
Glaverbel S.A., Watermael-Boitsfort, Belgium
Filed June 1, 1971, Ser. No. 148,402
Claims priority, application Great Britain, May 21, 1971,
16,282/71
Int. Cl. B32b *17/10, 31/12;* C03c *15/02*
U.S. Cl. 156—3                                                27 Claims

ABSTRACT OF THE DISCLOSURE

A laminate, and a method of manufacture therefor, of a plurality of sheets, at least one of which is of glass, the glass sheet having one face which is an internal face of the laminate which has been preliminarily subjected to a rectifying treatment for reducing the severity of flaws likely cause stress concentrations when tensioning forces are applied to that face of the glass sheet.

BACKGROUND OF THE INVENTION

This invention relates to a method of making a panel incorporating a plurality of sheets, at least one of which is a sheet of glass, secured together in facing relationship to form a laminate The invention also relates to panels made by such method.

When a laminate incorporating a sheet of glass as above referred to is subjected to forces tending to flex the laminate, the sheet of glass will break if it becomes flexed to more than a certain extent which depends on the maximum tensile forces which it is capable of withstanding.

It would be advantageous to be able to alter the breakage characteristic of such laminates intended for certain uses.

SUMMARY OF THE INVENTION

It is an object of the invention to provide laminates having improved breakage characteristics.

The present invention particularly provides a method of producing such a laminate wherein the sheet of glass has a higher resistance to breakage by flexure in at least one direction.

A method according to the invention of making a panel having a plurality of sheets, at least one of which is a sheet of glass, secured together in facing relationship to form a laminate, is carried out by subjecting the sheet of glass, hereafter referred to as the first sheet, over at least part of its area to a rectifying treatment which improves a face of the first sheet by reducing the severity therein of flaws likely to cause stress concentrations when tensioning forces are applied to that sheet face, and by assembling and securing the sheets together to form the laminate in such a manner that the thus improved face of the first sheet is located internally of the laminate.

In the method according to the invention, the performance of the rectifying treatment has the important consequence that in the resulting laminate the treated sheet has a higher resistance to breakage in the event that the laminate is subjected to flexing forces tending to stretch the treated face of the first sheet. Moreover, this feature is not diminished with time because that face is protected from further impairment by the layer which bears against it in the laminate.

It has moreover been found that, in the manufacture of laminates of various compositions, the performance of a rectifying treatment in accordance with the invention has a value which is manifest not only in the greater resistance of the first sheet to breakage by flexing forces tending to stretch the improved face thereof, but also in the reduced risk of damage to the remainder of the laminate. The first sheet may for example be secured to a sheet which could possibly be cut or ruptured if the first sheet breaks due to impact by a body tending to stretch the improved face thereof. Under such circumstances, breakage of the first sheet by such body may entail complete penetration of the body through the laminate.

It is preferable for the rectifying treatment to be applied to one face only of the first sheet. In some cases, for example when both sides of the first sheet are to be covered in the laminate, the other face of the first sheet may also be subjected to a rectifying treatment over the whole or a part of its area, but this is generally not recommended.

It is, in fact, surprising that such substantial benefits are to be obtained by confining the rectifying treatment to one face of the first sheet. In fact, in the case of a glass sheet incorporated in a laminate, an improvement in the resistance of the sheet to breakage is often particularly important with respect to flexing forces acting against one side of the laminate. By confining the rectifying treatment to one face of the glass sheet, the preparation of the laminate is simplified and the required improvement in the strength of the laminate is obtainable with less risk of spoiling the optical properties of the glass sheet.

When performing a rectifying treatment at elevated temperature, any surface or surface portion of the first sheet which is not to be subjected to such treatment can be shielded, for example by means of a refractory member. In the case of relatively low temperature treatments, the surface or surface portion which is not to be treated can be temporarily covered, for example with a paraffin wax or a peelable varnish which can be easily removed with cold water.

Advantageously, at least one marginal zone of the first sheet is subjected to the rectifying treatment. It has been found that the number of surface flaws in a glass sheet causing stress concentrations on application of tensioning forces to that surface of the sheet is often greater at marginal portions of the sheet. Such faults probably arise in the course of the usual preliminary cutting and handling operations. It is advantageous also to subject at least one edge portion of the first sheet to a rectifying treatment. Faults causing stress concentrations are often present at the sheet edges.

A rectifying treatment performed in a method according to the invention can advantageously be a heat treatment causing a fine polishing of at least one surface portion of the first sheet. Such treatment can be performed by preheating the sheet to a temperature of between 400 and 450° C. and then exposing the surface portion to the rectified for a relatively brief period, for example from a few seconds to a few minutes, to a higher temperature, for example substantially in the range 600 to 850° C. It has been found that this type of rectifying treatment can be performed with little or no tendency for the optical properties of the sheet to be impaired, which is a very important consideration in the manufacture of laminates for various purposes, for example laminates to be used as glazing panels.

Another very satisfactory type of rectifying treatment which can be performed in lieu of, or in addition to, fire polishing involves chemical dissolution of a face of the first sheet over at least part of its area. This type of treatment is easy to perform. For example, the treatment can consist of a simple contact of the sheet with a solvent medium by sprinkling, spraying or immersion, there being no need to use a large or expensive installation. Moreover, the degree of rectification can be easily controlled by varying the concentration of the solvent medium.

Such a dissolution treatment can advantageously be performed by contacting the surface area or areas to be treated with an acid medium containing fluorine ions. It has been found that acid media containing fluorine ions give very satisfactory results quite rapidly and that surfaces treated by such media show an improved mechanical strength and an improved resistance to iridescence.

When performing rectification by chemical dissolution, it is preferable to dissolve, in the treated area or areas, a surface layer having a thickness at least equal to the deepest flaw present in such area or areas and likely to cause such stress concentrations. In that manner, all flaws likely to cause such stress concentrations in the treated zone or zones become eliminated and the mechanical strength of the sheet material is made substantially uniform over the treated zone or zones.

When performing a rectification treatment by chemical dissolution, any surface portion not to be treated can be shielded from the solvent medium by a protective layer. Such protective layer may, for example be a layer of paraffin wax, a peelable varnish or a thin fluid film such as a film of water which is caused to flow along the surface portion or portions to be protected during the rectification treatment. By taking such a protective measure, the rectification treatment can be confined to a given zone or zones, thereby permitting a minimum amount of solvent to be used. Moreover, it has been found that certain optical faults in a glass sheet may be rendered more visible if a face of the sheet is subjected to acid treatment, particularly to treatment with an acid medium containing fluorine ions, unless that face is subsequently contacted by a layer of organic material. It is therefore recommended, particularly when making windshields, for one face of the first sheet to be protected from contact by acid unless both faces are to be covered by organic material in the laminate.

According to particularly important embodiments of the invention, the process of making the panel includes at least one process step which produces compressive stresses in the first sheet in surface layers at a face thereof which is to be located internally of the laminate and which has been or becomes improved by a rectifying treatment. Such step has the important consequence of further increasing the resistance of the sheet to breakage by flexure which tends to stretch such inner face.

Advantageously, the external layers of glass adjacent both faces of the first sheet are compressively stressed substantially identically; i.e. symmetrically relative to the median plane of the sheet. Symmetrical stressing can be more readily achieved in an industrial process performed on glass sheets prior to incorporation into a laminate.

Compressive surface stressing of the first sheet can be brought about at least in part by a tempering treatment. Such a tempering treatment can be performed before or after, but preferably before, the rectifying treatment. The performance of a tempering treatment has the effect of influencing the breakage characteristics of the sheet in the sense that if the sheet should break it will divide into rather small pieces which are less likely to cause injury to people or objects in the vicinity of the panel, or even to adjacent material of the laminate such as by cutting or rupturing an adjacent sheet of the laminate as hereinbefore referred to.

The surface layers of glass in the first sheet can be compressively stressed by subjecting the sheet to a thermal tempering treatment involving rapid cooling of the sheet after heating it to above the annealing temperature or annealing range. By thermal tempering it is possible to place the internal layers of glass in the sheet under very high tension so that in the event of the sheet being broken it will divide into very small fragments.

Preferably, however, the surface layers of glass in the first sheet are compressively stressed by a treatment involving diffusion of ions into one or both faces of the first sheet. By such an ion diffusion, known as a chemical tempering treatment, very high compressive surface stresses can be produced and if the glass so tempered becomes broken, it divides into small blunt pieces. Moreover, the first sheet can be readily chemically tempered even if it is very thin, e.g. less than 3 mm. in thickness.

Preferably, a chemical tempering treatment is performed wherein ions diffuse into both faces of the first sheet. Symmetrical stressing can then be achieved easily. However, diffusion of ions into one face only of the sheet will indirectly cause compressive stressing of the external layers at the other side of the sheet.

One type of chemical tempering treatment which can be employed involves a replacement of ions normally present in the first sheet, e.g. sodium ions, by larger ions deriving from a preferably molten contacting medium at a temperature lower than that which permits stress relaxation to occur in the sheet in the available time. In this type of tempering treatment, the larger ions diffusing into the sheet may, for example, be potassium, rubidium or cesium ions.

Alternatively, such diffusion may involve a replacement of ions normally present in the glass, e.g. sodium ions, by ions, deriving from a preferably molten contacting medium, which confer a lower coefficient of thermal expansion on the surface layers of the sheet, such substitution occurring at a temperature sufficiently high to permit stress relaxation to occur in the sheet. In this type of chemical tempering treatment, the ions diffusing into the sheet may, for example, be lithium ions.

However, for embodiments in which the first glass sheet is to be chemically tempered, any glass capable of being so tempered may be employed and any chemical tempering treatment capable of chemically tempering that particular glass may be employed. Generally, a treatment of either the high temperature type, the low temperature type or the cementation type can be employed.

Compressive stressing of one face of the first sheet can also be achieved at least in part by assembling the panel components in such a manner that the first sheet is physically held in a state of elastic flexure in one or more planes in a direction such that the compressive stresses exist as a result of the flexed condition of the sheet. This manner of compressively stressing the first sheet is easy to perform and does not involve a process step liable, if not performed with care, to impair the optical properties of the sheet. By way of example, the first sheet may be a naturally curved sheet which is secured at its convex face to a second sheet component of the laminate which is naturally flat, or which has a natural curvature less pronounced than the first sheet, so that in the completed panel the first sheet is held, against the elastic restoring forces therein, by the second sheet in a flat condition or at a curvature less than its natural curvature.

A panel produced according to the invention may include a frame for the laminated sheets and in that case the first sheet can be held in a state of elastic flexure by such frame if it is strong enough to resist the elastic restoring forces stored in the sheet when it is elastically flexed. This method of holding the first sheet in such elastically flexed state has the advantage that it is applicable regardless of the nature of the other component sheet or sheets of the laminate.

Alternatively, the first sheet may be held in such elastically flexed condition by a second component sheet of the laminate, if there is a second sheet which is strong enough to completely or partially resist the elastic restoring forces in the flexed first sheet. This manner of holding the first sheet in an elastically flexed condition is advantageous when it is not convenient or desirable to mount the laminate in a substantially rigid frame.

On the other hand it is sometimes advantageous for the first sheet to be held in an elastically flexed condition in part by means of a frame and in part by means of a second component sheet of the laminate. The elastic restoring forces are then sustained by more than one component of the panel.

Preferably, the first sheet, after improvement of a face thereof by a rectifying treatment, is secured to a second sheet constituting the only other strength member of the laminate, the second sheet being secured to the improved face of the first sheet. By such an assembly of two main sheets, a required combination of properties conferred by the constituent sheets can be easily achieved.

The first and second sheets preferably provide the external faces of the laminate. Such faces, or one of such faces, may if desired be coated, prior or subsequent to assembly of the sheets, with a coating composition, for example a composition which forms an antireflection layer or otherwise modifies the optical properties of the laminate. An antireflection layer is one which reduces the reflection and increases the transmittance of the overall assembly.

Alternatively, one or both of the main sheets may be covered over on the outside by a sheet material having a negligible resistance to flexure. For example such a covering sheet may be in the form of a thin plastic foil provided for protective or tinting purposes.

According to certain embodiments of the invention, the first sheet is secured, at an improved face thereof, to a second strength member in sheet form, such second sheet being a sheet of plastic material. The laminate produced then has a combination of properties, attributable to the different materials of the first and second sheets, which is very useful for certain purposes. The sheet of plastic can be directly bonded to the first sheet of glass with or without an intervening bonding layer.

Particular importance is attached to embodiments of the invention in which the first sheet of glass is secured at an improved face thereof to a second strength member in sheet form, the second sheet being of glass or vitrocrystalline material. Panels of this type are very suitable for use as glazing panels in buildings and vehicles, and particularly as vehicle windshields. The second sheet is preferably one which has been tempered to cause it to divide into small fragments in the event of breakage. In particularly preferred embodiments, the second sheet is one which has been chemically tempered, affording the advantage that if the sheet breaks, it divides into small blunt pieces which offer little risk of personal injury by laceration. The chemical tempering may be performed according to any of the chemical tempering processes hereinbefore described in relation to the treatment of the first sheet.

The term "vitrocyrstalline material" as used herein denotes a material formed from glass by a treatment which produces therein one or more crystalline phases and produces or leaves at least one vitreous phase constituting a substantial portion of the material.

In the most important of such embodiments of the invention, wherein the first sheet of glass is secured by an improved i.e. rectified, face thereof to a second strength member in sheet form which is a sheet of glass or vitrocrystalline material, the first sheet can, in the completed panel, be flexed to impose flexing forces on the second sheet sufficient to break that sheet. The panel then has very advantageous strength characteristics. In particular, the good resistance of the first sheet to breakage by flexure is utilized by enabling such first sheet to yield elastically without restraint by the second sheet when a given impact loading against the first sheet, causing flexure of the laminated sheets, is exceeded. This is of importance for example for avoiding concussive injury to a person who may make impact with the panel, for example in the case that it is used as a vehicle windshield with the first sheet facing the vehicle interior.

In optimum forms of such embodiments, in the completed panel the relative resistances of the first and second sheets, considered independently of each other, to breakage by flexure are such that the resistance of the second sheet to breakage by flexure which imposes tensioning forces on the outer face thereof, i.e. the face which in the completed panel is remote from the first sheet, is higher than the resistance of the first sheet to breakage by flexure which imposes tensioning forces on the inner face of that sheet, i.e. the face which in the completed panel faces the second sheet. This condition is not inconsistent with the condition that in the completed panel the second sheet should break under flexing forces, imposed against the first sheet, of a magnitude insufficient to break the first sheet, because in the completed panel the component sheets behave as a monolithic structure up to the moment of breakage of the second sheet and under any given flexing force the outer face of the second sheet is subjected to higher tensile loading than the inner face of the first sheet. The advantage of giving the second sheet the higher breakage resistance is that when the panel is used as a glazing panel, for example as a windshield or in a door, the second sheet is capable of absorbing a higher proportion of the impact energies before it breaks.

The relative strengths of the first and second sheets can be attained by making the second sheet of appropriately greater thickness than the first sheet. This is particularly advantageous if the second sheet has been tempered, preferably chemically, because the second sheet can have very good resistance to breakage due to impact by small hard objects such as stones, while the first sheet is thin enough to have a desired flexibility to assist in shock absorption. Alternatively, if in order to keep the weight of the panel below a certain value, or for other reasons, the thickness of the second sheet must be below the value which would be necessary, apart from other factors, for attaining such higher strength, the desired strength can be attained by means of chemical tempering or by a combination of such treatment and appropriate selection of the thickness of the sheet.

In embodiments of the invention wherein the first sheet is secured at an improved face thereof to a second strength member in sheet form and of glass or vitrocrystalline material, it is in some cases advantageous for the panel components to be assembled so that the second sheet is held in an elastically flexed state, for example by means of a frame component and/or by means of the first sheet. The second sheet can, for example be held in an elastically flexed condition such that its outer face is in a state of tension or reduced compression, whereby the flexing load at which the second sheet will break is lowered.

Advantageously, the first sheet is secured to a second sheet of glass or vitrocrystalline material by means of an intervening organic sheet or sheets. The first and second sheets can be directly secured to such an intervening sheet, for example by application of heat and pressure, of the first and second sheets may be secured to such an intervening sheet by means of bonding layers, for example layers of adhesive applied in liquid or paste form between the first and second sheets and the intervening sheet. The intervening sheet may, for example, be a sheet of organic polymeric material such as a sheet of polyvinyl butyral or polyvinyl chloride or a high molecular weight polycarbonate of a bis-phenol which may be secured by means of polyvinyl acrylate adhesive to the sheets between which it is sandwiched. This manner of securing the first and second sheets together enables a very satisfactory bond to be achieved. The intervening sheet can serve to retain individual pieces of the first and second sheets in the event of breakage, and a stable assembly of the two main sheets can be readily produced. Also the panel can have a very good transparency and other advantageous optical properties, such as a low optical distortion.

An intervening organic sheet for securing the first and second sheets together is preferably one which can serve as a safety net in the event that the first sheet becomes broken by the impact of a body against such sheet. Particularly in cases in which at least the first sheet is tempered, the panel then has very good properties for use as a glazing panel in situations where there is a risk of breakage of one or both sheets due to impact of a person against the panel. Due to the pre-lamination rectifying treatment of the first sheet in accordance with the invention, the risk of the panel being penetrated by a body, e.g. the head of a traveller in the case that the panel is used as a windshield, under high impact energies, is considerably reduced. If impact occurs against the first sheet, such sheet can cause breakage of the intervening organic sheet to commence only at higher impact energies than in the case of laminates in which no rectifying treatment has been performed. As hereinbefore referred to, the first sheet is preferably chemically tempered to promote the formation of small blunt pieces in the event of breakage of this sheet.

In processes in which the first sheet is secured by an improved face thereof to a second sheet of glass, that second sheet may itself be subjected over the whole, or part, of its area, for example over one or more central zones and/or over one or more marginal zones, to a rectifying treatment to reduce the severity of flaws on that face thereof which in the assembled panel is nearer the first sheet. In that case, the benefits of such a rectifying treatment are realized irrespective of which side of the panel may becomes exposed to high energy impact. This process feature is of advantage, for example, for making a glazing panel for a door which is liable to be subjected to impact forces at either side.

The second sheet may, if required, be subjected to a rectifying treatment at one or more edge portions of the sheet in the same manner as, and for the reasons described with regard to the treatment of, the first sheet.

If the second sheet is subjected to a rectifying treatment, that treatment may be performed in any of the ways hereinbefore described with regard to the treatment of the first sheet.

In many cases however it is preferable for only the first sheet to be subjected to a rectifying treatment so as to simplify manufacture and to make it easier to produce a panel with predetermined optical properties. A panel so produced can be installed so that the first sheet is at the side at which a high energy impact imposing flexing forces on the panel is most likely to occur.

According to certain embodiments of the invention, before and/or during assembly of the panel components, the first sheet is given a resistance to breakage, under flexing forces tending to stretch an improved face thereof which in the assembled panel is located internally of the laminate, such that a square sample of the sheet measuring 30 cm. on a side, will not break when supported at the periphery of such face, in a horizontal position, under the impact of a steel ball weighing 227 g. dropped from a height of $1.5+0.95t$ meters, where $t$ is the thickness of the sheet in millimeters.

Such resistance to breakage by flexure may be imparted simply by a rectifying treatment of the type described or by a combination of such a treatment and a tempering and/or assembling the panel components so that the first sheet is held in an elastically flexed state so as to place the rectified face of the first sheet under compression. Tests have shown that if a panel incorporating such first sheet which has been treated to be given such strength, is used as a windshield with the first sheet facing the interior of the vehicle, the risk of dangerous or fatal injury to the head of an occupant of the vehicle, by laceration in the event of impact against the windshield, is greatly reduced.

However, as vehicle speeds are tending to increase, with the consequential risk of more violent impacts, it is still more advantageous for the resistance to breakage of the first sheet to be even higher, and according to particularly important embodiments of the invention, the first sheet, in the completed panel, has a resistance to breakage such that a 30 cm. square sample of the sheet, when supported at the periphery of its rectified face in a horizontal position, will not break under the impact of a steel ball weighing 227 g. and dropped from a height of 3.4 meters.

In the case of a method wherein the first sheet is secured to one face of a second sheet made of glass or vitrocrystalline material, very satisfactory panels can also be produced by giving the second sheet, before and/or during the assembly of the panel, a resistance to breakage by flexure, tending to stretch the face thereof which in the completed panel faces the first sheet, such that the second sheet will not break under the impact of a steel ball in one or both of the tests which have just been described, the second sheet being supported at the periphery of the face thereof to be subjected to stretching in the test or tests. Nevertheless, for economic reasons and in order to make easier the carrying out of the said measuring tests, these tests permitting to measure the resistance to breakage by flexure are carried out on samples having a surface of 30 cm. square and having the same thickness and composition than as the sheets whose resistance is measured. The panel is then better resistant to breakage or penetration as a result of forces acting against the panel and tending to stretch that face of the second sheet. If the second sheet is made of glass, it can be given such resistance to breakage by or in part by a rectifying treatment prior to assembly of the panel sheets.

The present invention also includes any panel made by a method according to the invention as hereinbefore described.

The invention also includes any panel incorporating a plurality of sheets, including a first sheet, of glass, secured together in facing relationship to form a laminate, wherein the first sheet has a face which is located internally of the laminate and which over at least part of the area of the first sheet is free from flaws which cause substantial stress concentrations when such face is placed in tension.

The advantage of such a panel can be appreciated from the earlier description of panels produced by methods according to the invention, and particularly relates to the relatively high resistance of the first sheet to breakage in the event that the laminate is subjected to flexing forces tending to stretch the internally located face of the first sheet.

Advantageously, the whole or at least one zone of the internally located face of the first sheet, for example at least one central or at least one marginal zone of such face, is substantially free of flaws having boundary surfaces with abrupt changes in direction from one point to another. Faults with rounded boundary surfaces, and slight and gradual surface depressions, are not as likely to cause serious stress concentrations. In contrast, faults with sharp edges, e.g. faults mentioned hereabove and having boundary surfaces with abrupt changes in direction from one point to another, are likely to cause substantial stress concentrations and consequently to reduce the resistance to breakage of the face where they are present and when the said face is stretched by flexing forces.

In the event of high energy impact of a body against the first sheet at a zone where the internally located face is of such character, the stresses induced at that zone are distributed much more uniformly in that face than the stresses arising in the corresponding faces of the outer sheets of known laminates when they are subjected to impact at the same high energy level.

It has also been found that if the first sheet has such a high grade internally located face which is free from faults leaving exposed contiguous face surface portions which form an angle having a sharp apex as above referred to, the optical properties of the sheet are improved.

Preferably only one face of the first sheet has such a fault-free quality. There is then less chance of the optical properties of the sheet having been adversely affected by the treatment which improves its surface quality. However, panels in which both faces of the first sheet have been given such fault-free quality are not excluded from the scope of the invention and are particularly of interest in embodiments where the first sheet is enclosed between other plies of the laminate. Preferably, at least one edge portion of the first sheet also has such fault-free quality.

It is an advantage for the layers of glass in the first sheet adjacent its high grade face to contain fluorine ions. The presence of fluorine ions increases the mechanical strength of the sheet and generally assures that the sheet will divide into small blunt fragments in the event the sheet becomes broken, thereby reducing the risk of injury to persons or objects in the vicinity of the panel.

The layers of glass in the first sheet adjacent its high grade face are preferably compressively stressed. The advantage of this feature, and of various other optional features of the panel hereinafter referred to, are implicit in the statements made earlier in this specification concerning the advantages afforded by the corresponding method features.

Preferably, the external layers of glass adjacent both faces of the first sheet are compressively stressed so that the stress pattern is substantially symmetrical across the thickness of the sheet, i.e. with respect to the median plane of the sheet. The strength and breakage characteristics of the sheet then tend to be optimum.

Compressive surface stresses in the first sheet can advantageously be due at least in part to a tempering treatment of the sheet, e.g. a thermal tempering treatment.

In preferred forms of panel according to the invention, surface layers of glass in the first sheet are subject to inherent compressive stresses due at least in part to a chemical tempering treatment, this being manifest by the fact that such layers contain a concentration of ions of at least one element, e.g. lithium, sodium, potassium, rubidium or cesium, which is substantially different from the concentration of ions of that element or elements in the subjacent layers. In such cases, the first sheet of the panel exhibits a high resistance to breakage by flexing forces and possesses breakage characteristics which are very favorable from the point of view of avoiding laceration injury.

It is in many cases advantageous for the first sheet to be held in the panel in a state of elastic flexure in a direction such that compressive stresses exist in that sheet at the side of its high quality internally located face.

The panel may include a frame which holds at least the first sheet in a state of elastic flexure as above referred to. Alternatively, such state of elastic flexure may be maintained by a second sheet component of the laminate if there is a second sheet component which is strong enough to resist complete relaxation of the elastic restoring forces in the flexed first sheet. As a further alternative, the first sheet can be held in the panel in a state of elastic flexure in part by a frame and in part by a second sheet component.

Preferred panels according to the invention incorporate the first sheet and a second sheet which is the only other strength member, such second sheet being secured to the high quality internally located face of the first sheet. Preferably, the first and second sheets provide the external faces of the laminate. Either or both of such external faces can bear a surface coating and the invention includes panels in which one or both of such first and second sheets is or are covered over on the outside by a sheet of material of negligible resistance to flexure.

Panels of simple form according to the invention are composed of a laminate in which the first sheet of glass is secured by its high quality internally located face to a second strength member in sheet form, such second sheet being a sheet of plastic.

In the most preferred forms of panel according to the invention, the first sheet of glass is secured by its high quality internally located face to a second strength member in sheet form, the second sheet member being a sheet of glass or vitrocrystalline material. Preferably the second sheet is one which has been tempered, preferably chemically tempered.

Panels of particular importance are composed of a first sheet secured by its high quality internally located face to a second strength member in sheet form, which is of glass or vitrocrystalline material, and the first sheet can be flexed to impose flexing forces on the second sheet sufficient to break the latter sheet.

It is an advantage if in the completed panel, the relative resistances of the first and second sheets, considered independently of each other, to breakage by flexure are such that the resistance of the second sheet to breakage by flexure which imposes tensioning force on the face thereof which is remote from the first sheet is higher than the resistance of the first sheet to breakage by flexure which imposes tensioning forces on the face of that sheet which faces the second sheet. The second sheet is preferably thicker than the first sheet, particularly in the case of panels in which the second sheet is chemically tempered.

According to an advantageous feature, in a panel as aforesaid incorporating a second sheet of glass or vitrocrystalline material, the second sheet is held in the panel in a state of elastic flexure: e.g. by means of a frame and/or by means of the first sheet. For many purposes it is particularly beneficial for the second sheet to be held so as to be elastically flexed in a direction such that its face facing away from the first sheet is in a state of tension or reduced compression as a result of such flexure.

Special importance is attached to panels according to the invention wherein the first sheet is secured by its high quality internally located face to a second sheet of glass or vitrocrystalline material by means of an intervening organic sheet or sheets. Such an intervening sheet may be made of thermoplastic material, e.g. a sheet of high impact polyvinyl butyral of controlled adherence, or a high molecular weight polycarbonate of a bis-phenol, which may be secured to the first and second sheets by means of a polyacrylate or polyvinyl chloride adhesive.

In panels containing a second sheet which is of glass, it is preferable for certain purposes for that face of the second sheet which faces the first sheet to be one which has not been treated to free it from flows liable to cause stress concentrations in the event of that face of the second sheet being subjected to tensioning forces. In the case of panels to be used as windshields with the first sheet on the inside, it is often unnecessary for the internally located face of the second sheet to be free from flaws liable to cause such stress concentrations.

On the other hand, there are cases in which it is advantageous for the internally located face of the second sheet of glass, over at least one part of the sheet area, to be free from flaws liable to cause stress concentrations if that face is tensioned.

It is in any event an advantage in a panel composed of first and second sheets of glass for at least one of such sheets to have at least one edge portion free from flaws liable to cause substantial stress concentrations.

According to a further optional but valuable feature, a panel according to the invention incorporates a second sheets to have at least one edge portion free from flaws than the first sheet and the first sheet has a thickness in the range of 1 to 2.5 mm. whereas the second sheet has a thickness in the range of 1.5 to 4 mm. Such panels are particularly valuable as glazing panels, e.g. in a building or a vehicle. When observing such relative thickness conditions it is comparatively easy to form a fairly flexible and mechanically strong product with good shock-absorbing properties and good resistance to penetration by a body at high impact energy levels.

The advantage of using a panel, according to the invention, composed of first and second sheets of glass, the first sheet having a high quality internally located face, has been demonstrated by comparative tests in which a first lot of ten windshields, each having an overall thickness of 6.4 mm. and composed of two sheets of ordinary glass and an intervening sheet of polyvinyl butyral 0.76 mm. thick, were peripherally supported and exposed to the impact of a rounded body weighing 10 kg. simulating a human head dropped from a height of 350 cm., and in which a second lot of ten windshields of identical composition except for the fact that the internally located face of one of the glass sheets of each laminate had been treated and rendered substantially fault-free prior to incorporation of the sheet in the laminate, were subjected to the same test, the treated sheet being directly exposed to the impact. The windshields of the first lot were all shattered by the impact and were penetrated by the body, whereas the windshields according to the invention were not penetrated.

An example of a type of panel according to the invention which has very favorable properties for use as a glazing panel in a building or vehicle, is a panel wherein the first sheet of glass has resistance to breakage, under flexing forces tending to stretch its high quality internally located face, such that a 30 cm. square sample of the sheet, when supported at the periphery of that face in a horizontal position, will not break under the impact of a steel ball weighing 227 g. dropped from a height of $1.5 + 0.95t$ meters, where $t$ is the thickness of the sheet in millimeters.

Panels according to the invention which are still more advantageous are those in which the first sheet has a resistance to breakage under flexing forces such that a 30 cm. square sample of the sheet, when supported at the periphery of its high quality internally located face in a horizontal position, will not break under the impact of a steel ball weighing 227 g. dropped from a height of 3.4 meters.

In the foregoing, reference has been made to the employment of an acid medium containing fluorine ions as a rectifying medium. As will be subsequently exemplified, the first sheet can advantageously also be treated with an acid medium containing fluorine ion after chemical tempering of the sheet, by contacting the tempered sheet with such an acid medium for a brief period of time. Such an acid treatment after chemical tempering has been found to promote uniformity of strengthening of the sheet and also to increase the resistance of the glass to iridescence. This post-tempering treatment can e.g., be performed with an aqueous solution containing hydrofluoric acid and is preferably performed by means of a solution containing both hydrofluoric acid and sulphuric acid, e.g., a solution containing 7% by volume of hydrofluoric acid and 7% by volume of sulphuric acid, at a temperature, e.g., in the range 0° to 80° C. Both faces of the first sheet can be contacted with the acid in such post-tempering treatment. A similar acid treatment can be applied to a second glass sheet of the laminate if such a second sheet is used.

BRIEF DESCRIPTION OF THE DRAWINGS

FIG. 5 is a cross-sectional view of the components of another windshield made according to the invention.

FIG. 6 is a cross-sectional view of a windshield assembled from the components illustrated in FIG. 5.

FIG. 7 is a cross-sectional view of still another panel made according to the invention.

DESCRIPTION OF THE PREFERRED EMBODIMENTS

Figure 1:
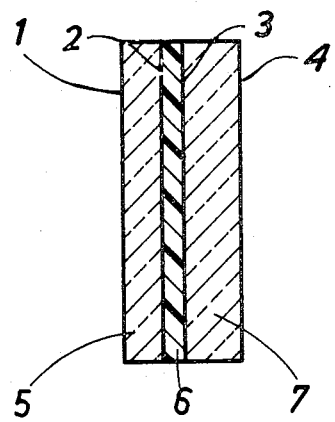
FIG. 1 is a cross-sectional view of one embodiment of a panel manufactured according to the invention.

In the following description of the embodiments of FIGS. 1 to 11, the reference numerals 1, 2, 3 and 4 are utilized to designate respective faces of the components of the various embodiments of the invention. The illustrated embodiments will be described with reference to a series of specific examples. All of the embodiments of the invention are multilayer articles having a flat or curved configuration and generally constitute closure panels or vehicle windshields. Therefore, reference throughout the following description to panels or windshields is to be construed as in reference to such multilayer articles.

Example 1

The article illustrated in FIG. 1 is composed of a glass sheet 5 measuring 1.5 m. x 2 m. and formed of a glass having the following composition, by weight:

| | Percent |
|---|---|
| $SiO_2$ | 72 |
| $Al_2O_3$ | 3 |
| $Na_2O$ | 12 |
| $CaO$ | 12 | the remainder being constituted by small amounts of ingredients such as MgO and $Fe_2O_3$. The other major component of the panel of FIG. 1 is vitrocrystalline sheet 7 measuring 1.5 m. x 2 m. and having the following composition by weight:

| | Percent |
|---|---|
| $SiO_2$ | 42.3 |
| $Al_2O_3$ | 31.2 |
| $Na_2O$ | 10.4 |
| $K_2O$ | 6.2 |
| $CaO$ | 1.8 |
| $TiO_2$ | 7.4 |
| $As_2O_3$ | 0.7 |

The sheets 5 and 7 are fabricated so that the sheet 5 has a thickness of 1.65 mm. and the sheet 7 has a thickness of 4 mm. Before assembly of the panel, the face 2 of a series of sheets 5 is subjected to a treatment by means of an aqueous solution at a temperature of 20° C., the solution having the following composition:

8.8 liters of water
0.6 liter of $H_2SO_4$
0.6 liter of 70% HF

This latter treatment lasted for 60 minutes and served to remove 60μ from the face 2, which corresponded to 1.5 times the depth of the most serious flaws noted on the face prior to treatment. The other face 1 of the sheets 5 had been coated with paraffin before the treatment to prevent substantially any contact of that face by the solution.

After cleaning and drying the treated sheets, panels were formed by joining such a treated sheet 5 having a thickness of 1.65 mm. to a sheet 7 having a thickness of 4 mm., the attachment being by means of a sheet 6 of high impact polyvinyl butyral having a thickness of 0.76 mm. This attachment was effected in such a manner that sheet 5 adheres by its face 2 to sheet 6.

Then, a comparison was made between the penetration resistance of these panels and the penetration resistance of similar panels composed of two sheets of the same material as sheets 5 and 7 but which had not been subjected to the treatment applied to face 2 of sheets 5. For purpose of this comparison, ten panels of each type were subjected to impact by a rounded mass simulating a human head, the mass weighing 10 kg. and being dropped from a height of 3.5 m. onto the face 1 of sheet 5 of each panel. It was noted that for the ten panels which had not been subjected to the flaw removal rectifying treatment, the rounded mass at least partially penetrated the high impact polyvinyl butyral sheet, while, for the panels fabricated according to the invention, where the face 2 of sheet 5 had been subjected to such rectifying treatment, there was no incidence of even a partial penetration of the panels by the rounded mass.

The panels according to the invention were formed to be utilized as closure panels between two rooms of a dwelling or as balcony parapets.

Example 2

Other panels having a form illustrated in FIG. 1 were formed from two sheets 5 and 7 measuring 0.75 m. x 2 m. and made of soda-lime glass having the following composition, by weight:

| | Percent |
|---|---|
| $SiO_2$ | 71 |
| $Al_2O_3$ | 4 |
| $Na_2O$ | 13 |
| CaO | 11 | the remainder being constituted by impurities.

Sheet 5 had a thickness of 2.5 mm. while sheet 7 had a thickness of 3.75 mm. Before assembly of the panel, face 2 of each sheet 5 of a series of such sheets was subjected to a fire polishing treatment. For this purpose, the sheets 5 were preheated to 450° C. and then placed above a flame obtained by passing propane and compressed air through a porous refractory piece. The sheets were maintained with their face 2 directed toward the flame for 45 seconds, by which time the temperature at the surface of face 2 reached a value of 660° C. The sheets were then progressively cooled in a furnace having an initial temperature of 450° C.

Panels according to the invention were constructed by attaching one of the sheets 5 treated as above to one of the sheets 7 by means of a sheet 6 of ordinary polyvinyl butyral and having a thickness of 0.8 mm., the face 2 of sheet 5 contacting the sheet 6.

A test was performed of ten panels according to the invention, of the type just described, and ten comparison panels identical with the panels according to the invention with the exception that their sheet 5 had not been subjected to a fire polishing treatment. For purposes of this comparison, the ten panels of each type were subjected to impact by a rounded mass simulating a human head, the mass weighing 10 kg. and falling from a height of about 1.5 m. onto face 1 of sheet 5. The result of this test was that, for the ten panels which had not been subjected to a fire polishing according to the invention, the rounded mass caused tearing of the sheet 6 and penetrated that sheet, while for the ten panels according to the invention, there was no incidence of even a partial penetration of any of the panels.

Example 3

Further panels according to the invention, and similar to the panels described in Example 2 were fabricated from two sheets 5 and 7 of soda-lime glass and an intervening sheet of polyvinyl butyral 6. The panels measured 0.75 m. x 2 m., and the panel 5 had a thickness of 2.5 mm. while the panel 7 had a thickness of 3.75 mm. After assembling the panels, a 2 cm. wide marginal zone around the periphery of each of faces 1 and 4, as well as the edges of sheets 5 and 7, were treated for 30 minutes with an aqueous solution containing substantially 10%, by volume, hydrofluoric acid, the solution being maintained at 50° C.

The panels thus formed were compared with identical comparison panels which differed therefrom only in that they had not been subjected to the above-described acid treatment. This comparison was effected by dropping a rounded 10 kg. mass simulating a human head on the face 1 of the panels of the comparison group and the group formed according to the invention. This mass was dropped from a height of 1.5 m. onto the comparison panels and resulted in each case in a penetration, and tearing, of the said intervening sheet 6. On the other hand, the mass was dropped from a height of 2 m. onto the panels formed according to the invention and did not result in any incidence of tearing or penetration of the said intervening sheet 6 for any of these panels.

Example 4

Figure 2:
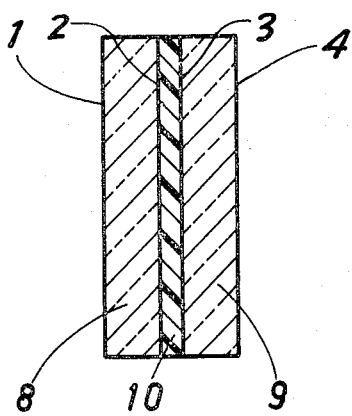
FIG. 2 is a cross-sectional view of another panel made according to the invention.

Panels having the form illustrated in FIG. 2 were each assembled from two sheets 8 and 9 of soda-lime glass having the following composition, by weight:

| | Percent |
|---|---|
| $SiO_2$ | 75 |
| $Na_2O$ | 12 |
| CaO | 10 |
| $Al_2O_3$ | 2 | the remainder consisting of minor amounts of various compounds.

Sheets 8 and 9 both measure 0.6 m. x 2 m. x 3 mm. Two types of panels were assembled from these sheets. The first type of panel was fabricated according to the present invention by subjecting one face of each of the sheets 8 and 9 to a rectifying treatment by an aqueous solution contaiinng 7%, by volume, hydrofluoric acid and 7%, by volume, sulphuric acid. Prior to this treatment, a thin sheet of a plastic material such as a copolymer of vinyl chloride and vinyl acetate in solution in ethyl acetate and impervious to the aqueous solution was cemented to one face of each of the sheets, which face was not to be treated. Then, a group of twenty sheets was immersed in the aqueous solution, which was maintained at a temperature of 20° C., and the sheets were withdrawn from the solution after one hour of treatment. The sheets were then washed and dried and the protective layer of plastic material was removed.

Then, the treated sheets were assembled, two by two, by being joined together by means of a sheet 10 of high impact polyvinyl butyral having a thickness of 0.7 mm., the sheets being arranged so that the treated surfaces were in contact with the sheet 10.

The panels of the second type were formed by joining together, two by two, glass sheets having the composition set forth above, the sheets not being subjected to the above-described rectifying treatment and being joined together by a polyvinyl butyral sheet identical with that provided in the panels of the first type.

The two types of sheets were subjected to comparative tests of their resistance to penetration due to the impact of a rounded 10 kg. mass simulating a human head and dropped from a height of 3.5 m. It was observed that for ten panels of the second type, the impact produced tearing of the polyvinyl butyral sheet and the 10 kg. mass partially penetrated that sheet. In contrast, for 10 panels of the first type, there was no incidence of any tearing or penetration of the sheet 10. The panels of the first type were made to be utilized as glass doors, so that the probability of their being struck by a human head was the same for both sides thereof.

Example 5

Figure 3:
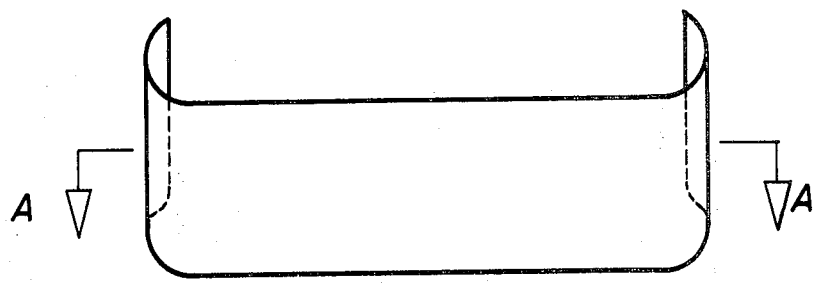
FIG. 3 is a simplified perspective view of one embodiment of a windshield made according to the invention.
Figure 4:
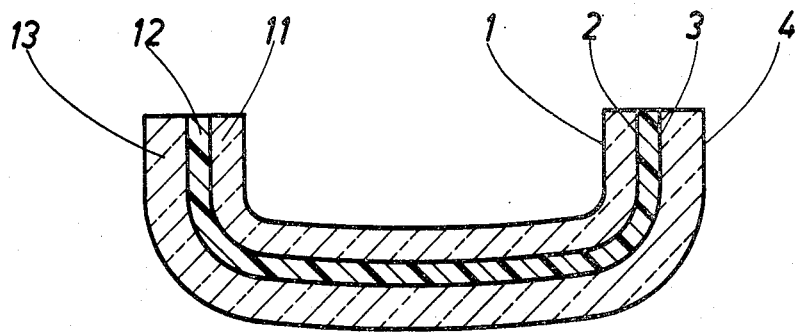
FIG. 4 is a cross-sectional view taken along the line A—A of FIG. 3.

A panel intended to be utilized as a windshield and having the form illustrated in FIGS. 3 and 4 was made from two sheets 11 and 13 of a glass having the following composition, by weight:

| | Percent |
|---|---|
| $SiO_2$ | 70 |
| $Na_2O$ | 12 |
| CaO | 10 |
| MgO | 3 |
| $Fe_2O_3$ | Traces |
| $Al_2O_3$ | 5 |

Sheet 11 had a thickness of 1.45 mm. and sheet 13 had a thickness of 4 mm. Before the sheets were assembled together to form windshields, faces 2 of a series of sheets 11 were partially treated by an aqueous solution maintained at a temperature of 20° C. and having the following composition:

8.8 liters of water
0.6 liter of $H_2SO_4$
0.6 liter of 70% HF

The treatment was partial in that this solution was brought into contact with only the central part of the face 2 of each sheet 11, the part treated including the zone which will be directly in front of the driver and the zone directly in front of the front seat passenger when the windshield is installed in an automobile. Thus, the treated part of face 2 is that part which is opposite the part of face 1 most likely to be stuck by a person's head in case of an accident.

Each sheet 11 thus treated was joined to a sheet 13 by means of a high impact polyvinyl butyral sheet 12 having a thickness of 0.76 mm., the face 2 of sheet 11 being in contact with the sheet 12.

The resulting windshields were tested for their penetration resistance by dropping a rounded 10 kg. mass simulating a human head from a height of 3.5 m. onto a region of face 1 of sheet 11 which is directly opposite the treated portion of face 2. It was noted that for ten windshields thus tested, more than half broke without any penetration by the mass. For purposes of comparison, ten windshields were constructed which were identical with those according to the invention, except neither of their sheets had been subjected to the acid rectifying treatment described above. These windshields were subjected to the same penetration test and it was noted that for each windshield, the 10 kg. mass tore and penetrated the high impact polyvinyl butyral sheet 12.

Example 6

A plurality of panels of a first type identical to the panel of the first type described in Example 4 were fabricated. These panels had the form illustrated in FIG. 2 and were made of two sheets each measuring 0.6 m. x 2 m. x 3 mm. The two sheets were joined together by means of a sheet 10 having a thickness of 0.8 mm. and composed of a high molecular weight polyvinyl chloride, a low molecular weight polyvinyl chloride being employed as the adhesive. The sheets were joined together in such a manner that the treated face 2 of sheet 8 was in contact with the sheet 10, or the adhesive bonding the sheet 10 to the glass sheets.

Contrary to the procedure employed in Example 4, face 2 had been preliminarily treated with a normal 0.005 aqueous solution of NaOH maintained at a temperature of 85° C. Preparatory to this treatment, the sheets 8 and 9 had the faces thereof which were not to be treated covered with a layer of paraffin. Then, the sheets 8 and 9 were immersed for two hours in the NaOH solution.

In comparative tests, the resulting assemblies were tested for their resistance to penetration due to the impact of a rounded mass simulating a human head, which mass weighed 10 kg. and was dropped from a height of 3.5 m. This test was carried out on ten panels of the second type described in Example 4 and in each case produced a tearing of the polyvinyl chloride sheet 10 and a partial penetration of the mass through the sheet 10. By way of comparison, the test was carried out on ten panels formed in the manner described above in the present example and there was no incidence of any tearing or penetration. The panels of the present invention fabricated according to this example were intended to be utilized as glass doors in situations where the probability of impact by a human head against the doors was the same for their two faces.

Example 7

The present example is directed to windshields comparable to that shown in FIGS. 3 and 4 and constituted by two sheets 11 and 13 formed of the soda-lime glass described in Example 5, the sheet 11 being intended to be disposed toward interior of the automobile, while the sheet 13 was intended to be disposed toward the exterior. Both sheets had a thickness of 1.5 mm. and the two sheets were joined together by means of a 0.76 mm. thick sheet 12 of high impact polyvinyl butyral. Prior to assembly, one face of each sheet 11, i.e., the face 2 which is to come into contact with the intervening sheet 12, was treated for one hour in a bath containing 7%, by volume, hydrofluoric acid and 7%, by volume, sulphuric acid, the bath being at a temperature of 20° C. During the treatment in the bath, the other face 1 of each sheet 11, which face was not to be treated by the solution, was covered with a layer of a protective organic material such as paraffin.

Control sample sheets 30 cm. square, made of the same glass and having the same thickness as sheets 11, were treated by means of the same acid solution and in the same manner as were sheets 11. After this treatment, the sheets 11 and the sample sheets were washed and dried and the protective layer of organic material was removed.

Then, a group of these sheets 11, as well as the samples treated as described above and a group of sheets 13, were immersed for twenty-four hours in a potassium nitrate bath, maintained at 460° C. and containing 0.2%, by weight, potassium carbonate. Each sheet 11 was then joined to a sheet 13 by means of a sheet 12 of 0.76 mm. thick high impact polyvinyl butyral. A group of windshields of a second type were also formed upon one sheet 11 and one sheet 13 each, the sheets being of the same composition and dimensions as described earlier in the present example. Before assembly of these windshields of the second type, the surface layers of these sheets 11 and 13 were subjected to an ion exchange treatment by immersing them for twenty-four hours in a potassium nitrate bath maintained at 460° C. and containing 0.2%, by weight, potassium carbonate. The assemblies of the second type were produced by joining sheets 11 and 13 together by an intervening 0.76 mm. thick sheet 12 of high impact polyvinyl butyral, i.e., a material having a selected adherence.

In comparative tests, ten windshields according to the present invention produced in the manner described in the initial part of this example, and ten windshields of the second type whose fabrication is described immediately above, were subjected to a test of their resistance to penetration due to impact by a rounded mass simulating a human head, the mass weighing 10 kg. and being dropped from a height of 6.2 m. The result was consistently less penetration and tearing of the intervening sheet 12 in the case of windshields according to the present invention than in the case of windshields of the second type.

Comparative tests were also carried out on the above-described square samples, these tests involving dropping a steel ball weighing 227 g. from a height of 2.9 m. onto the face of each sample corresponding to the face 1 of sheet 11, the other face of each sample, corresponding to face 2, having been treated with hydrofluoric acid and potassium nitrate. It was noted that the face 2 of these samples satisfactorily withstood the impact produced by the steel ball. For purposes of comparison, square samples identical with those described above, with the exception that they had not been treated with the hydrofluoric acid solution, were subjected to a similar test in which the same steel ball was dropped from a height of 2.5 m. The faces of these samples did not withstand the impact by the ball.

Example 7a

A batch of windscreens was formed as represented in FIGS. 5 and 6, each windscreen comprising two sheets 14, 16 of soda-lime glass of the composition specified in Example 5, each sheet being 1.5 mm. in thickness, and a sheet 15 of "high impact" polyvinyl butyral 0.70 mm. in thickness. Each sheet of glass which was to form the inner ply of a windscreen was naturally curved so that the face of that sheet which was to be located internally of the laminate (i.e., face 2) was convex. Each sheet of glass which was to form the outer ply of a windscreen was naturally curved so that the face of that sheet which was to be located internally of the laminate (i.e., face 3) was concave. The inner ply sheets were naturally curved more strongly, i.e., to a smaller radius of curvature than the outer ply sheets. Each inner ply sheet 14 was subjected to a rectifying treatment with acid and to a chemical tempering treatment, both treatments being as performed in Example 7. The sheets 14 and 16 of each windscreen were then secured together by means of the polyvinyl butyral sheet located between the convex surface of sheet 14 and the concave surface of sheet 16 and the assembled sheets were mounted in a frame 17. In the course of the assembly the inner sheet 14 was elastically flexed and held in elastically flexed condition by the outer sheet 16 and the frame 17 so that compressive stresses were present in the inner side of sheet 14 due to its flexed condition. In other words sheet 14 was held in the panel in a state of reduced curvature as compared with its natural state. Moreover the frame held the assembled sheets at a slightly larger radius of curvature than the natural curvature of the plastics sheet 16 so that in the final panel the convex side of such plastics sheet was also compressively stressed.

The windscreens thus produced were subjected to an impact test of the kind used in Examples 1 and 2, in comparison with a batch of windscreens which had been made in the same way with the sole exception that the sheets of glass had a natural curvature corresponding with their final curvature so that the sheets were not in a state of elastic flexure in the panel. In the tests, the body weighing 10 kg. was allowed to fall on the exposed concave face of the inner sheet (sheet 14) of each windscreen while the windscreen was peripherally supported. It was found that while the windscreens in which there was no compressive stresses at the inner side of sheet 14 due to elastic flexure showed good resistance to penetration by the body when it was released from a height of 6.2 m., the resistance to penetration of the other windscreens in which such compressive stresses due to elastic flexure were present, was even better.

Example 8

Windshields having the form illustrated in FIGS. 3 and 4 were formed from two sheets 11 and 13 each made of a soda-lime glass having the following composition, by weight:

| | Percent |
|---|---|
| $SiO_2$ | 73 |
| $Na_2O$ | 14 |
| $CaO$ | 10 |
| $Al_2O_3$ | 3 |

The sheet 11 had a thickness of 1.7 mm. and was intended to be disposed toward the interior of an automobile, while the sheet 13 had a thickness of 3.2 mm. and was intended to be disposed toward the exterior of the vehicle. Each sheet 11 was joined to a sheet 13 by means of a 0.76 mm. thick intervening sheet 12 of high impact polyvinyl butyral. Before assembly, the face 2 of each sheet 11, which face was to come in contact with the sheet 12, was treated for one hour in a bath containing 7%, by volume, hydrofluoric acid and 7%, by volume, sulphuric acid, the bath being maintained at a temperature of 20° C. During this treatment, the other face 1 of each sheet 11, which was not to be treated, was covered with a layer of a plastic material, such as a copolymer of vinyl chloride and vinyl acetate in solution in ethyl acetate. Sample sheets 30 cm. square, of the same material and having the same thickness as sheets 11, were treated with the same aqueous acid solution and in the same manner as sheets 11. After treatment, the sheets 11 and the square samples were washed and dried and the layer of protective organic material was removed.

Then, a group of sheets 11 and the treated square samples, as well as a group of sheets 13, were immersed for twenty-four hours in a bath of potassium nitrate maintained at a temperature of 475° C. After withdrawal from the bath and drying, both faces of sheets 11 and 13 and both faces of the square samples which had been treated in the same manner as sheets 11 were subjected to attack by an aqueous solution of hydrofluoric acid containing 7%, by volume, hydrofluoric acid and 7%, by volume, sulphuric acid, the solution being maintained at a temperature of 20° C. and the attack being performed for a period of approximately two minutes. Then, each thus treated sheet 11 was joined to a thus treated sheet 13 by means of a 0.76 mm. thick sheet 12 of high impact polyvinyl butyral, the sheets being arranged so that the face 2, which had been successively treated with hydrofluoric acid, potassium nitrate, and hydrofluoric acid, was in contact with sheet 12. The resulting windshields constituted assemblies of a first type.

Windshields constituting assemblies of a second type were each fabricated of two sheets 11 and 13 of the same composition as that described at the beginning of the present example, sheet 11 having a thickness of 1.7 mm. and sheet 13 having a thickness of 3.2 mm. Before assembly of these windshields of a second type, the surface layers of the sheets 11 and 13 were subjected to an ion exchange by immersing the sheets in a bath of potassium nitrate maintained at 475° C. The sheets 11 and 13 were then joined together by means of a 0.76 mm. thick sheet 12 of high impact polyvinyl butyral.

In comparative tests, a group of ten windshields of the first type and a group of ten windshields of the second type were subjected to a test of their resistance to penetration by dropping a rounded 10 kg. mass simulating a human head from a height of 6.2 m., the mass being dropped onto face 1 of each windshield. It was noted that there was less penetration and tearing of the intervening layer 12 in the case of windshields of the first type than in the case of windshields of the second type.

Tests were also carried out on the 30 cm. square sample pieces by dropping a steel ball weighing 227 g. on the face of each sample corresponding to the face 1 of sheet 11, the face of each sample corresponding to the face 2 of sheet 11 having been successively treated with hydrofluoric acid, potassium nitrate, and hydrofluoric acid. The result of this test was that the face of these samples corresponding to the face 2 of sheet 11 resisted the impact by the ball dropped from a height of 3.4 m. By way of comparison, 30 cm. square samples formed of the same glass as sheet 11 of the present example and having a thickness of 1.7 mm., and which had been treated with potassium nitrate, but not with hydrofluoric acid, did not resist impact by the steel ball dropped from a height of 2.9 m.

Example 9

Panels having the form illustrated in FIG. 1 were formed from two sheets 5 and 7 of soda-lime glass having the following composition, by weight:

| | Percent |
|---|---|
| $SiO_2$ | 72.0 |
| $Na_2O$ | 16.0 |
| $CaO$ | 10.0 |
| $MgO$ | 0.2 |
| $Na_2SO_4$ | 0.8 |
| $Al_2O_3$ | 1.0 |

Both sheets measured 2 m. x 1 m., sheet 5 having a thickness of 2.5 mm. and sheet 7 having a thickness of 3.1 mm. The sheets were joined together by means of 0.76 mm. thick sheet 6 of high impact polyvinyl butyral.

Before assembly, the face 2 of each sheet 5, that is, the face which was intended to come into contact with the sheet 6 in the finished assembly, was treated with an aqueous solution containing substantially 7%, by volume, hydrofluoric acid and 7%, by volume, sulphuric acid, the solution being maintained at a temperature of 30° C. The treatment was carried out in such a manner as to be limited to the edges of each sheet 5 and the entirety of the periphery of face 2 of that sheet over a region having a width of substantially 1 cm. To this end, the central portion of face 2, and the entirety of face 1, were covered with a suitable protective layer. This treatment lasted for 30 minutes.

After this treatment, and also before assembly, each sheet 7 was subjected to a strengthening treatment by immersing it for twenty-four hours in a bath of potassium nitrate maintained at 450° C. As an alternative, the sheets 7 could be subjected to a known thermal tempering treatment involving a uniform heating up to a temperature near the softening point, following by a rapid cooling.

Chemically tempered sheets 7 were then joined to sheets 5 treated in the manner described above, by means of intervening sheets 6 to produce the resulting panel. A group of these panels were subjected to comparative tests of their resistance to penetration due to impact by a rounded 10 kg. mass simulating a human head dropped from a height substantially equal to, but slightly greater than, 3.5 m. A group of twenty such panels were subjected to this test, the mass falling on sheet 5, and the result was no incidence of penetration of the mass through the layer 6. For purposes of comparison, a group of similar panels were formed of two sheets of the same material and dimensions, the sheets having been treated and joined together in the manner described above, with the exception that the face 2 and the edges of the sheet 5 had not been subjected to a hydrofluoric acid treatment. The result of the same impact test on these panels was that most of them suffered penetration of their intervening sheet 6 by the mass.

Example 10

Panels having the form illustrated in FIG. 7 were each formed from one sheet 18 of soda-lime glass, having the following composition, by weight:

| | Percent |
|---|---|
| $SiO_2$ | 71 |
| $Na_2O$ | 13 |
| $Al_2O_3$ | 4 |
| CaO | 11 | the remainder being minor amounts of various compounds, each sheet 18 measuring 2 m. x 1 m. x 3 mm., and of a sheet 20 of vitrocrystalline material having the following composition, by weight:

| | Percent |
|---|---|
| $SiO_2$ | 43 |
| $Al_2O_3$ | 33 |
| $Na_2O$ | 10 |
| $K_2O$ | 6 |
| $TiO_2$ | 8 | the dimensions of sheet 20 being 2 m. x 1 m. x 2 mm.

These sheets 18 and 20 were joined together by means of a 0.8 mm. thick sheet 19 of high impact polyvinyl butyral. The resulting assemblies were intended for use as closure panels for the walls of an enclosure, the vitrocrystalline sheet 20 being intended to be disposed toward the exterior of the enclosure. Before assembly, the sheets 18 were thermally tempered by heating them to a temperature near their softening point and then rapidly cooling them. Then, the face 2 of each sheet 20 was subjected to a rectifying treatment by means of an aqueous solution maintained at a temperature of 20° C. and having the following composition:

8.5 liters of water
0.6 liter of $H_2SO_4$
0.6 liter of 70% HF.

This rectifying treatment lasted forty minutes nad resulted in the removal of a layer approximately 35μ thick.

After sheets 18 had been thus treated, a group of panels were assembled. Ten of these panels were subjected to mechanical strength tests by dropping onto their face 1 a rounded 10 kg. mass simulating a human head and dropped from a height of 6.2 m. The results of this test were compared with the results of an identical test carried out on panels which differed from those described above only in that the sheet 18 had not been subjected to a rectifying treatment. The result of the comparative tests was a lower incidence of tearing and penetration of the intervening sheet 6 in the case of assemblies whose sheet 18 had been subjected to the rectifying treatment than in the case of the comparison assemblies whose sheet 18 had not been subjected to such treatment.

Example 11

Figure 8:
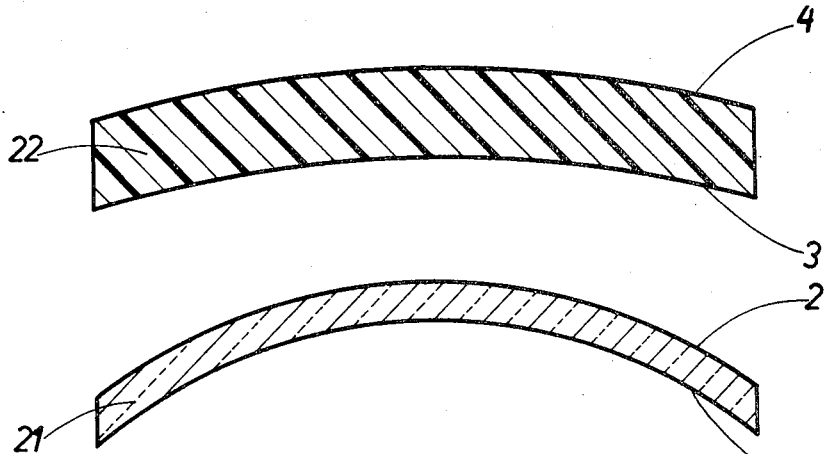
FIG. 8 is a cross-sectional view of the components of a duplex-type panel made according to the invention.
Figure 9:
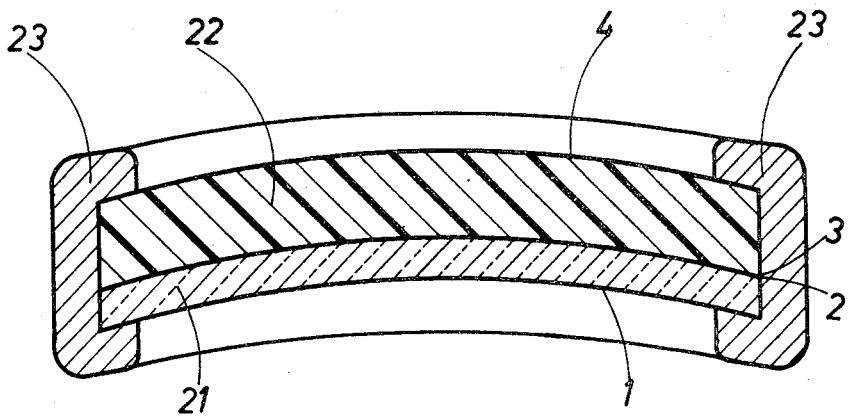
FIG. 9 is a cross-sectional view of a panel made from the components of FIG. 8.

Panels of the duplex type having the form illustrated in FIGS. 8 and 9 were formed from an acrylic plastic sheet 22 having a thickness of 12 mm. and a soda-lime glass sheet 21 of ordinary composition and having a thickness of 2.5 mm., the sheet 22 being intended to be disposed toward the exterior when the panels are employed as closure panels for a dwelling.

Before assembly, sheets 21 had been given a curvature such that when the panels were joined together by means of a metal frame 23 and/or a thin intervening sheet of polyvinyl butyral (not shown) serving as a bonding element, the sheets 21 were flexed in a direction to give them a reduced curvature. This served to induce compressive stresses in face 2 of each sheet 21. Before assembly, the sheets 21 were treated in the following manner:

(a) Firstly, face 2 of each sheet 21, i.e., the face intended to come into contact with sheet 22, was subjected to a fire polishing treatment. This was performed by preheating the sheets 21 to 450° C., then placing them above a flame produced by passing propane and compressed air through a porous refractory piece, maintaining the sheets with their face 2 directed toward the flame for forty-five seconds, by which time the temperature at the face 2 reached 660° C., and then progressively cooling the sheets in a furnace having an initial temperature of 450° C.;

(b) The sheets 21 were then subjected to a chemical tempering strengthening treatment by immersing them for twenty minutes in a bath containing 2%, by weight, $LiNO_3$ and 98%, by weight, NaCl, the bath being maintained at a temperature of 580° C.

After these two treatments, the average resistance to flexure of a series of six of the sheets 21 was measured and it was noted that the value of this average resistance was of the order of 100 kg./mm.$^2$.

Then, after assembly of a plurality of panels, each composed of one such sheet 21 and a sheet 22, the penetration resistance of the panels was tested by dropping onto their face 1 from a predetermined height a rounded 10 kg. mass. The exact same resistance penetration test was performed on a group of panels also having the form of the panel illustrated in FIG. 9 and identical with the above-described panels, with the exception that there sheet 21 had not had its face 2 subjected to a fire polishing treatment. The results of these tests revealed that the latter group of panels had a poorer resistance to penetration than did the first-described group of panels.

In a modified procedure according to the method of the present invention, panels were constructed which were similar to those described at the beginning of the present example but which differed therefrom in that the acrylic plastic sheet 22, rather than being constituted by a single sheet, was constituted by two acrylic plastic sheets joined together by a 0.6 mm. thick sheet of polyvinyl butyral. It was determined that these panels also possessed a good resistance to penetration by a rounded mass impacting against the face 1 of sheet 21, provided that the face 2 of this latter sheet had been subjected to a fire polishing treatment and a chemical tempering with lithium.

Example 12

Figure 10:
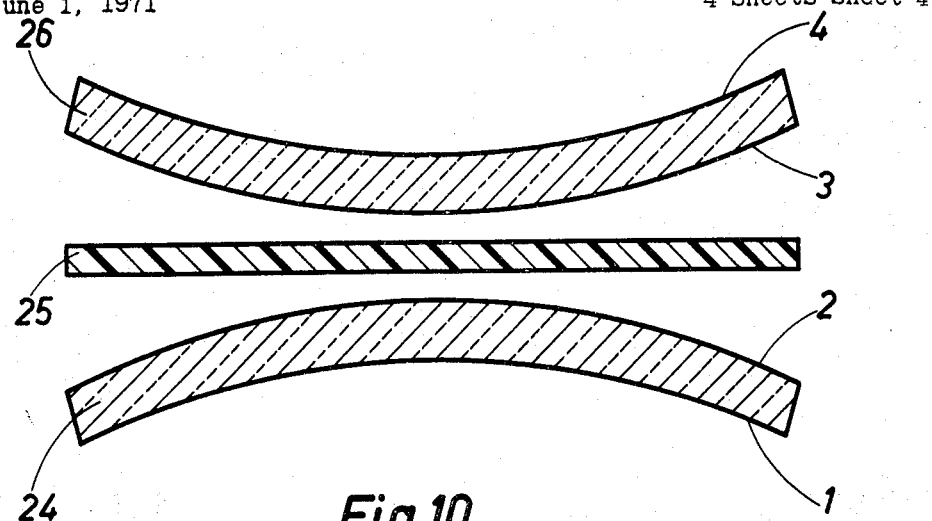
FIG. 10 is a cross-sectional view of the components of yet another panel formed according to the invention.
Figure 11:
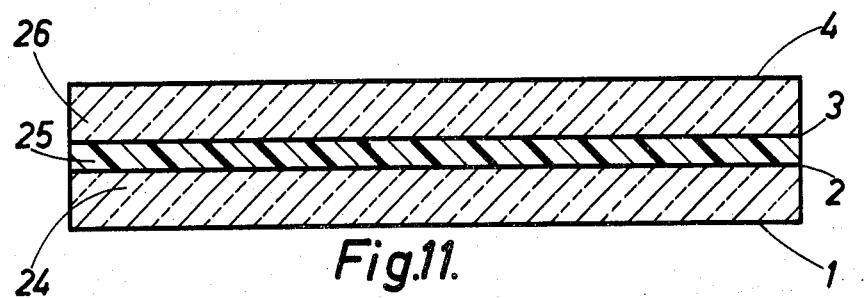
FIG. 11 is a cross-sectional view of a panel made of the components of FIG. 10.

A batch of panels was formed, each panel being formed as represented in FIGS. 10 and 11 from two sheets 24 and 26 measuring 1 m. x 2.10 m. x 0.002 m. and composed of soda-lime glass of the following general composition:

|  | Percent |
| --- | --- |
| $SiO_2$ | 70 |
| $Na_2O$ | 16.3 |
| $CaO$ | 11.0 |
| $MgO$ | 0.6 |
| $Al_2O_3$ | 1.4 |
| $Na_2SO_4$ | 0.7 |

The glass sheets 24, 26 had a similar natural curvature as appears from FIG. 10.

Before assembling the glass sheets of each panel the face 2 of sheet 24 and the face 3 of sheet 26 were subjected to a rectifying treatment. This was performed by applying to faces 1 and 4 a solution of a vinyl chloride/vinyl acetate copolymer in ethyl acetate to form protective plastics layers on those faces and then immersing the sheets for 30 minutes in a bath containing 7% by volume of hydrofluoric acid and 7% by volume of sulphuric acid at a temperature of 20° C. After treatment and removal of the protective plastics layers, the glass sheets were immersed for 24 hours in a bath of potassium nitrate at 450° C. to effect chemical tempering. The sheets were then washed and dried and the sheets were then secured together to form a flat laminate by means of an interposed sheet 25 of "high impact" polyvinyl butyral 0.76 mm. in thickness. In forming the laminate the sheets 24 and 26 were located with their convex faces facing inwardly as represented in FIG. 10 and the sheets were elastically flexed into a flat state so that in the completed laminate compressive stresses were present in the inner sides of the sheets 24, 26 as a result of the elastic flexure. Depending on the magnitude of the inherent compressive stresses induced in the sheets by chemical tempering and on the degree of natural curvature of these sheets, faces 1 and 4 in the completed panel are in tension or reduced compression. In order to promote the sability of the panel and to assist in maintaining the sheets 24 and 26 in flat condition against the elastic recovery forces in these sheets, the laminate could be mounted in a frame (not shown in FIG. 11).

The panels produced as above described were subjected to an impact test of the kind used in Examples 1 and 2, the rounded body weighing 10 kg. being allowed to fall onto face 4 of the panels, and for comparative purposes an identical test was performed on flat panels comprising outer glass sheets of the same size and composition as the sheets 24, 26 secured together by an intervening sheet of "high impact" polyvinyl butyral 0.76 mm. in thickness, these comparative panels differing from those produced according to the invention however, in that the glass sheets were naturally flat and were subjected only to a chemical tempering treatment and not to any treatment with acid, prior to assembly. The panels produced according to the invention were found to be much more resistant to penetration by the dropped body.

The panels produced according to the present example of the invention were very suitable for use as wall panels of a room where there is possibility of forceful impact occurring against either of the external panel faces.

Example 13

Figure 12:
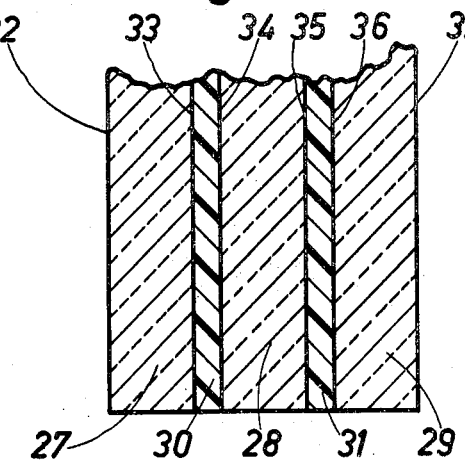
FIG. 12 is a cross-sectional detail view of yet a further embodiment of a panel made according to the present invention.

A group of panels having the form illustrated in FIG. 12 were fabricated from three sheets 27, 28 and 29 of soda-lime glass having the following composition by weight:

|  | Percent |
| --- | --- |
| $SiO_2$ | 70.0 |
| $Na_2O$ | 15.0 |
| $CaO$ | 9.0 |
| $MgO$ | 0.6 |
| $Al_2O_3$ | 3.7 |
| $Na_2SO_4$ | 0.7 | the remainder being small amounts of impurities. The sheets 27, 28 and 29 had identical dimensions of 1 m. x 2 m. x 13 mm.

Before assembly, these sheets 27, 28 and 29 were strengthened by a chemical tempering operation which involved immersion for twenty-four hours in a bath of potassium nitrate maintained at 450° C. Also before assembly, the faces 33, 35 and 37 of sheets 27, 28 and 29, respectively, were treated for thirty minutes with an aqueous solution having the following composition:

9 liters of water
0.6 liter of $H_2SO$
0.6 liter of 70% HF.

while the faces 32, 34 and 34 were protected from this latter treatment by being covered with a layer of paraffin.

After the rectifying treatment, the panels were washed and dried and the layer of paraffin was removed. Then, sheets 27, 28 and 29 were joined together by means of two 0.4 mm. thick sheets 30 and 31 of polyvinyl butyral. The resulting panels were intended to serve as inspection windows for an aquarium, such as for dolphins, the panels being mounted in such manner that the face 32 of sheet 27 would be in contact with the water in the aquarium.

Mechanical strength tests performed on such panels revealed that these panels were capable of withstanding uniform pressures of 3 m. of water against the face 32 and dynamic forces due to the falling of a body within the water. By way of comparison, to obtain panels having a satisfactory mechanical strength with respect to the same pressure and dynamic force levels, but composed of sheets which had not been subjected to the acid rectifying treatment, it would be necessary for these panels to have a thickness of 70 mm.

It will be understood that the above description of the present invention is susceptible to various modifications, changes and adaptations and the same are intended to be comprehended within the meaning and range of equivalents of the appended claims.

I claim:

1. In a method of making a panel composed of a plurality of sheets, including a first sheet of glass and a sheet of plastic, secured together in facing relationship to form a laminate, the improvement comprising: subjecting only the first sheet of glass over at least part of only one face to a rectifying treatment, which improves that face of the first sheet by reducing on that face the severity of flaws capable of causing stress concentrations when tensioning forces are applied to that face; chemically tempering said first sheet to produce compressive stresses at at least the one face thereof; and assembling the securing the sheets of the panel together so that the one face of the first sheet is located internally of the laminate and thus faces the sheet of plastic, the laminate serving to yield elastically to, and absorb the energy of, impacts against the other face of the first sheet.

2. A method as defined in claim 1 wherein said step of subjecting is carried out on at least one marginal zone of said one face of the first sheet.

3. A method as defined in claim 1 wherein said rectifying treatment comprises a heat treatment which fire polishes at least one surface portion of said one face of the first sheet.

4. A method as defined in claim 1 wherein said rectifying treatment comprises a chemical dissolution of said one face of the first sheet over at least part of its area.

5. A method as defined in claim 4 wherein said dissolution is effected by contacting the surface area to be treated with an acid medium containing fluorine ions.

6. A method as defined in claim 4 wherein said rectifying treatment serves to dissolve a surface layer having a thickness at least equal to the depth of the deepest flaw present in such area before treatment and liable to cause such stress concentrations.

7. A method as defined in claim 4 wherein a portion of the surface of said first sheet is not to be dissolved and comprising the preliminary step of applying a protective layer to such portion for shielding such portion from said rectifying treatment.

8. A method as defined in claim 1 wherein said step of tempering is carried out on both faces of said first sheet for creating compressive stresses which are substantially symmetrical with respect to the median plane of said first sheet.

9. A method as defined in claim 8 wherein the tempering treatment is a treatment involving a diffusion of ions into at least one face of said first sheet.

10. A method as defined in claim 1 comprising the further step of producing additional compressive stresses at the one face thereof by elastically flexing the first sheet and performing said step of assembling so that said first sheet is maintained elastically flexed.

11. A method as defined in claim 10 wherein said step of assembling is carried out by placing said sheets in a frame so that such frame at least assists in maintaining said first sheet elastically flexed.

12. A method as defined in claim 10 wherein said step of assembling is carried out by joining said first sheet to the plastic sheet so that said first sheet is maintained elastically flexed at least in part by the plastic sheet.

13. A method as defined in claim 1 wherein, said first sheet and plastic sheets are the only sheets of said panel capable of supporting loads, and said step of assembly and securing is carried out by securing said plastic sheet to said one face of said first sheet.

14. A method as defined in claim 13 wherein said step of assembling is carried out for causing said first and plastic sheets to provide the external faces of the panel.

15. A method as defined in claim 1 wherein said plastic sheet is a load supporting sheet.

16. A method as defined in claim 1 wherein said plurality of sheets includes a second sheet of glass or vitrocrystalline material, said first and second sheets being capable of supporting loads, and said step of assembling and securing is carried out by securing said first and second sheets together so that said one face of said first sheet is directed toward said second sheet.

17. A method as defined in claim 16 further comprising tempering said second sheet.

18. A method as defined in claim 16 wherein said first and second sheets are associated in the panel so that flexure of said first sheet toward said second sheet imposes flexing forces on said second sheet sufficient to break said second sheet.

19. A method as defined in claim 18 wherein in the completed panel, said first and second sheets are given relative resistances to breakage by flexure, when considered independently of each other, such that the resistance of said second sheet to breakage by flexure which imposes tensioning forces on the face thereof which in the completed panel is remote from said first sheet is higher than the resistance to breakage of said first sheet by flexure which imposes tensioning forces on the face of said first sheet which in the completed panel faces said second sheet.

20. A method as defined in claim 19 wherein the higher relative resistance to breakage of said second sheet is achieved at least partially by giving said second sheet a greater thickness than said first sheet.

21. A method as defined in claim 19 further comprising chemically tempering said second sheet for at least partially giving it such higher resistance to breakage.

22. A method as defined in claim 16 further comprising elastically flexing said second sheet and wherein said step of assembling is carried out so as to maintain said second sheet elastically flexed.

23. A method as defined in claim 22 wherein said second sheet is maintained elastically flexed so that its face facing away from said first sheet is in a state of tension or reduced compression.

24. A method as defined in claim 16 wherein said plastic sheet is between said first and second sheets and said first sheet is secured to said second sheet by means of said plastic sheet.

25. A method as defined in claim 24 wherein said plastic sheet is capable of serving as a safety net in the event that said first sheet becomes broken by the impact of a body thereagainst.

26. A method as defined in claim 1 wherein said step of subjecting assists in giving said first sheet a resistance to breakage under flexing forces tending to stretch said one face thereof such that a 30 cm. square sample of said first sheet, when supported at the periphery of said one face in a horizontal position, will not break under the impact of a steel ball weighing 227 g. and dropped from a height of $(1.5+0.95t)$ meters, where $t$ is the thickness of said first sheet in millimeters.

27. A method as defined in claim 26 wherein said first sheet is given a resistance to breakage under said flexing forces such that said sample, when supported at the periphery of said one face in a horizontal position, will not break under the impact of a steel ball weighing 227 g. and dropped from a height of 3.4 meters.

References Cited
UNITED STATES PATENTS

| | | | |
|---|---|---|---|
| 3,023,139 | 2/1962 | Van Tetterode | 156—24 |
| 1,999,562 | 4/1935 | Galey | 65—65 R |
| 3,317,297 | 5/1967 | Ray | 65—31 |
| 3,396,075 | 8/1968 | Morris | 156—102 |
| 3,282,772 | 11/1966 | Davis, Sr. | 156—102 |
| 3,616,048 | 10/1971 | Bresciani | 65—31 |
| 3,625,792 | 12/1971 | Shaffer | 156—106 |
| 3,615,322 | 10/1971 | Bogart et al. | 65—65 R |
| 3,616,839 | 11/1971 | Burrin et al. | 156—99 |

DANIEL J. FRITSCH, Primary Examiner

U.S. Cl. X.R.

65—31, 65 R; 156—8, 24, 82, 99, 101, 102, 106, 212; 161—183, 199, 203, 204